(12) United States Patent
Seguchi (10) Patent No.: US 9,860,843 B2
(45) Date of Patent: *Jan. 2, 2018

(54) WIRELESS COMMUNICATION DEVICE (71) Applicant: PANASONIC INTELLECTUAL PROPERTY MANAGEMENT CO., LTD., Osaka (JP)

(72) Inventor: Yoshiaki Seguchi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 16 days.

This patent is subject to a terminal disclaimer.

(21) Appl. No.: 14/940,224

(22) Filed: Nov. 13, 2015

(65) Prior Publication Data

US 2016/0150479 A1     May 26, 2016

(30) Foreign Application Priority Data

Nov. 21, 2014   (JP) .................................. 2014-236606

(51) Int. Cl.
*H04W 52/02*     (2009.01)
*H04L 1/08*      (2006.01)
(Continued)

(52) U.S. Cl.
CPC ........ *H04W 52/0251* (2013.01); *G08B 13/08* (2013.01); *H04L 1/08* (2013.01);
(Continued)

(58) Field of Classification Search
None
See application file for complete search history.

(56) References Cited

U.S. PATENT DOCUMENTS 5,692,197 A *  11/1997  Narad .................... G06F 1/3209
                                                    713/310
9,432,939 B2 *  8/2016  Sugitani ............ H04W 52/0225
(Continued)

FOREIGN PATENT DOCUMENTS

JP     2008-077529      4/2003
JP     2011-160238      8/2011
(Continued)

OTHER PUBLICATIONS

The Extended European Search Report from the European Patent Office, dated Apr. 20, 2016, for the related European Patent Application No. 15195452.6.
(Continued)

*Primary Examiner* — Ayaz Sheikh
*Assistant Examiner* — Faiyazkhan Ghafoerkhan
(74) *Attorney, Agent, or Firm* — Greenblum & Bernstein, P.L.C.

(57) ABSTRACT

A wireless communication device for packet communication is provided. When a battery is mounted, a control signal for obtaining information necessary for packet communication is received, and the information is stored in a first communication information storage unit, along with a reception frequency of the control signal. In a waiting state, main components for wireless communication are powered off. The main components for the wireless communication are powered on at the time of sensor detection. The packet communication is performed using the information in the first communication information storage unit.

4 Claims, 5 Drawing Sheets

(51) Int. Cl.
*G08B 13/08* (2006.01)
*H04W 56/00* (2009.01)
*H04W 76/02* (2009.01)
*H04W 88/04* (2009.01)

(52) U.S. Cl.
CPC ..... *H04W 52/0216* (2013.01); *H04W 56/001* (2013.01); *H04W 76/021* (2013.01); *H04W 76/027* (2013.01); *H04W 88/04* (2013.01); Y02B 60/50 (2013.01)

(56) References Cited

U.S. PATENT DOCUMENTS

| | | | |
|---|---|---|---|
| 2004/0039504 A1* | 2/2004 | Coffee | B28C 5/422 701/482 |
| 2007/0139195 A1* | 6/2007 | Jin | G08B 13/08 340/547 |
| 2007/0194914 A1* | 8/2007 | Gates | G08B 13/08 340/541 |
| 2011/0102171 A1* | 5/2011 | Raji | G06F 17/30873 340/539.11 |
| 2013/0057404 A1* | 3/2013 | Thibault | G08B 13/08 340/545.1 |
| 2013/0121223 A1* | 5/2013 | Sugitani | H04W 52/02 370/311 |
| 2013/0121224 A1* | 5/2013 | Sugitani | H04J 3/1694 370/311 |
| 2016/0150477 A1* | 5/2016 | Sugitani | H04W 52/0225 455/574 |

FOREIGN PATENT DOCUMENTS

| | | |
|---|---|---|
| JP | 2013-098883 | 5/2013 |
| JP | 2013-098884 | 5/2013 |
| JP | 2013-236393 | 11/2013 |

OTHER PUBLICATIONS

"Digital Enhanced Cordless Telecommunications (DECT); Common Interface (CI); Part 2: Physical Layer (PHL)", ETSI EN 300 175-2 V1.9.1, Sep. 2005, pp. 1-64.

"Digital Enhanced Cordless Telecommunications (DECT); Common Interface (CI); Part 3: Medium Access Control (MAC) layer", ETSI EN 300 175-3 V1.9.1, Sep. 2005, pp. 1-235.

"Digital Enhanced Cordless Telecommunications (DECT); Common Interface (CI; Part 5: Network (NWK) layer", ETSI EN 300 175-5 V1.9.1, Sep. 2005, pp. 1-309.

"Digital Enhanced Cordless Telecommunications (DECT); Ultra Low Energy (ULE); Machine to Machine Communications; Part 1: Home Automation Network (phase 1)", ETSI TS 102 939-1 V1.1.1, Apr. 2013, pp. 1-169.

\* cited by examiner

WIRELESS COMMUNICATION DEVICE

BACKGROUND OF THE INVENTION

1. Field of the Invention

The present invention relates to a wireless communication device.

2. Description of the Related Art

In recent years, with the remarkable spread of data communication that is performed in a wireless manner, there have been advances in high communication speed, miniaturization of a wireless communication device, low power consumption, and improvement in security technology.

A technology for low power consumption by the wireless communication device that is used in a sensor or the like is disclosed in Japanese Patent Unexamined Publication Nos. 2013-98884 and 2013-236393. Wireless communication devices that are disclosed in Japanese Patent Unexamined Publication Nos. 2013-98884 and 2013-236393 reduce power consumption in a waiting state until a sensor performs detection, by powering off main components for wireless communication, such as a wireless unit, a control unit, and the like. Furthermore, the wireless communication devices store a failure situation at the time of communication in a state storage unit to which power is always supplied, and switch a base-unit detection operation for the wireless communication when the sensor becomes responsive, in a normal state or in a state where a communication failure takes place. Thus, a reduction in power consumption is realized.

Wireless communication in compliance with a Digital Enhanced Cordless Telecommunications (DECT) scheme that has been spread worldwide as a communication scheme for digital cordless telephones is stipulated in ETSI EN 300 175-2: "Digital Enhanced Cordless Telecommunications (DECT); Common Interface (CI); Part 2: Physical Layer (PHL)", ETSI EN 300 175-3: "Digital Enhanced Cordless Telecommunications (DECT); Common Interface (CI); Part 3: Medium Access Control (MAC) layer", and ETSI EN 300 175-5: "Digital Enhanced Cordless Telecommunications (DECT); Common Interface (CI); Part 5: Network (NWK) layer". Also in Japan, the use of wireless devices in compliance with the DECT scheme was approved, and wireless communication devices, such as a cordless telephone and an intercommunication system, have been of practical use. In recent years, a system in which household electrical appliances within a house are controlled from outside of the house, a household crime prevention system, or the like has gained popularity. Developments in wireless communication for communication between apparatuses on such a home automation network have been made. A method for packet communication suitable for communication between apparatuses on the home automation network, which is based on the wireless communication in compliance with the DECT scheme, is stipulated in ETSI TS 102 939-1: "Digital Enhanced Cordless Telecommunications (DECT); Ultra Low Energy (ULE); Machine-to-Machine Communications; Part 1; Home Automation Network (Phase 1)" (communication stipulated in ETSI TS 102 939-1: "Digital Enhanced Cordless Telecommunications (DECT); Ultra Low Energy (ULE); Machine to Machine Communications; Part 1; Home Automation Network (Phase 1)" is hereinafter referred to as DECT ULE communication).

In such packet communication, data is stored in a packet to which a number is added, transmission and reception of data are performed on a packet-by-packet basis, re-transmission control is performed using the number that is added to the packet, and the transmission and the reception of data are performed. In a case of the DECT ULE communication, when the data to be transmitted or received is not present, the wireless communication is interrupted, and when the transmission of the data starts, the packet communication is resumed with a simple sequence. Furthermore, regardless of the interruption of the wireless communication, the packet communication is performed using consecutive packet numbers. Thus, low power consumption and a reduction in data transmission delay are realized. In such packet communication, encryption or authentication of communication data for improving security is performed. In a case of the DECT ULE communication, with encryption communication that uses a counter with cipher block chaining message authentication code (CBC-MAC), security improvement in the packet communication is realized.

SUMMARY OF THE INVENTION

A wireless communication device that transmits a data packet including a packet number to the other communication party, the wireless communication device including: a battery; a first storage unit to which power is supplied from the battery and in which the packet number is stored; a second storage unit in which a frequency that is used for communication with the other communication party is stored; an event detection unit to which the power is supplied from the battery and that detects an occurrence of an event; a control unit; a wireless communication unit that performs transmission and reception of the data packet between the wireless communication device and the other communication party, under the control of the control unit; and a connection control unit that supplies power of the battery to the second storage unit, the control unit, and the wireless communication unit, and that cuts off the supply of the power to the second storage unit, the control unit, and the wireless communication unit according to an instruction of the control unit, in a case where the battery is newly mounted, or in a case where the event detection unit detects the occurrence of the event. In the wireless communication device, in a case where the event detection unit detects the occurrence of the event, the control unit generates a data packet including a wireless link establishment request, a message notifying the occurrence of the event, and the packet number that is stored in the first storage unit, transmits the generated data packet from the wireless communication unit to the other communication party at the frequency that is stored in the second storage unit, updates the packet number that is stored in the first storage unit when a delivery acknowledgement is received from the other communication party, and gives an instruction to cut off the supply of the power to the connection control unit, in a case where the battery is newly mounted, the control unit attempts to establish synchronization between the wireless communication device and the other communication party, using the frequency that is stored in the second storage unit, in a case where the synchronization is not able to be established, the control unit attempts to establish synchronization while sequentially changing frequencies,—and in the case where the synchronization is able to be established, the control unit rewrites the frequency that is stored in the second storage unit, as a value that results when the synchronization is established, rewrites the packet number that is stored in the first storage unit, as an initial value that is determined in advance, and gives the instruction to cut off the supply of the power to the connection control unit.

DETAILED DESCRIPTION OF THE PREFERRED EMBODIMENT

A time division multiplex communication scheme, in which multiplex communication is performed in a state where 10 msec is set to be one frame and one frame is divided into 24 slots, is employed, in such a manner that a base unit that operates as a control station transmits a control signal that serves as a reference for timing for time division multiplex communication, a handset that operates as a slave station receives the control signal, and thus synchronization for the time division multiplex communication is established to perform communication, according to wireless communication in compliance with a DECT scheme, which is disclosed in ETSI EN 300 175-2: "Digital Enhanced Cordless Telecommunications (DECT); Common Interface (CI); Part 2: Physical Layer (PHL)", ETSI EN 300 175-3: "Digital Enhanced Cordless Telecommunications (DECT); Common Interface (CI); Part 3: Medium Access Control (MAC) layer", ETSI EN 300 175-5: "Digital Enhanced Cordless Telecommunications (DECT); Common Interface (CI); Part 5: Network (NWK) layer". The control signal is transmitted on a specific slot within one frame. With 16 frames being set to be one group (hereinafter called a multi-frame), a Pt message that is configured from call-to-control station information and the like, a Qt message that is configured from a frame for the time division multiplex communication of a frame number, a slot number, and the like, information for establishing slot synchronization, information for mapping to a physical frequency of a wireless signal and to a logical frequency number for communication control, and information relating to a function that the base unit has, and an Nt message that is configured from an identification number necessary for the slave station to specify the control station are periodically transmitted according to a T-MUX rule. In a case where the slave station retains synchronization for the time division multiplex communication with the control station, first, the slave station operates in such a manner as to receive the Nt message including the identification number of the control station with which the slave station itself is registered, specifies the control station with which the slave station itself is registered, continues to receive a control signal that is transmitted with a period of 10 msec, receives the frame number and the slot number that are transmitted with the Qt message, and the synchronization for the time division multiplex communication is completed. The slave station receives the information for mapping to the physical frequency of the wireless signal and to the logical frequency number for the communication control, and the information relating to the function that the base unit has, which are transmitted with the Qt message, and thus knows a management status relating to the wireless communication and enters a state where the communication between the control station and the slave station is possible.

However, in a method that is disclosed in ETSI EN 300 175-2: "Digital Enhanced Cordless Telecommunications (DECT); Common Interface (CI); Part 2: Physical Layer (PHL)", ETSI EN 300 175-3: "Digital Enhanced Cordless Telecommunications (DECT); Common Interface (CI); Part 3: Medium Access Control (MAC) layer", ETSI EN 300 175-5: "Digital Enhanced Cordless Telecommunications (DECT); Common Interface (CI); Part 5: Network (NWK) layer", the Qt message is transmitted on one specific frame within the multi-frame, the frame for the time division multiplex communication of the frame number, the slot number, and the like, information for establishing slot synchronization, the information for mapping to the physical frequency of the wireless signal and to the logical frequency number for the communication control, and the information relating to the function that the base unit has, which are to be transmitted with the Qt message, are transmitted being embedded one by one in the Qt message. Because of this, the period with which each piece of information is transmitted is in the order of several hundreds msec, and there is a problem that it takes long time to complete the synchronization for the time division multiplex communication.

In wireless communication in compliance with the DECT scheme that is described in ETSI TS 102 939-1: "Digital Enhanced Cordless Telecommunications (DECT); Ultra Low Energy (ULE); Machine to Machine Communications; Part 1; Home Automation Network (Phase 1)", in addition to the Pt message, the Qt message, and the Nt message, the identification number of the control station, the frame number, and the slot number are transmitted with the control signal that is transmitted on all frames, and thus the time taken to complete the synchronization for the time division multiplex communication is shortened.

However, a method that is disclosed in ETSI TS 102 939-1: "Digital Enhanced Cordless Telecommunications (DECT); Ultra Low Energy (ULE); Machine to Machine Communications; Part 1; Home Automation Network (Phase 1)", in a case where the information for mapping to the physical frequency of the wireless signal and to the logical frequency number for the communication control, and the information relating to the function that the base unit has, and the like, which are to be transmitted with the Qt message, are lost due to power-off without being transmitted with the control signal that is transmitted on all frames, these pieces of information need to be received again. A problem with a wireless communication device that realizes lower power consumption by using control that powers off a circuit portion for controlling the wireless communication in a waiting state, which is disclosed in Japanese Patent Unexamined Publication No. 2013-98884 or Japanese Patent Unexamined Publication No. 2013-236393, is that it is difficult to establish the synchronization within a short period of time after communication is started and to perform the communication, only with the method that is disclosed in ETSI TS 102 939-1; "Digital Enhanced Cordless Telecommunications (DECT); Ultra Low Energy (ULE); Machine to Machine Communications; Part 1; Home Automation Network (Phase 1)".

In the method that is disclosed in Japanese Patent Unexamined Publication No. 2013-98884 or Japanese Patent Unexamined Publication No. 2013-236393, although an operation is performed in such a manner that all pieces of information that are necessary to receive until the communication is started can be transmitted with a period of several frames and the circuit portion for controlling the wireless communication in the waiting state is powered off, the synchronization can be established within a short period of time after the communication is started and the communication can be performed.

In the wireless communication device that is disclosed in Japanese Patent Unexamined Publication Nos. 2013-98884 and 2013-236393, a slot or a frequency that is used in the wireless communication is determined in a state of being associated with a synchronization control signal that is transmitted in advance by the control station. Furthermore, in initial data communication, a message of which a delivery acknowledgement is not needed is used, and thus a procedure at the time of the communication is simplified and low power consumption during the communication is realized. However, realization of low power consumption is insufficient that relates to re-transmission control of an error at the time of data communication in a case where events occur at the same time in multiple sensors within a system and a collision of messages at the time of transmission occurs, or in a case where a reception error occurs due to interference from other wireless devices. Because the procedure at the time of communication is simplified, it is difficult to meet a demand for data encryption.

An embodiment of the present invention will be described.

First Exemplary Embodiment

Configuration of a Cordless Telephone

Figure 1:
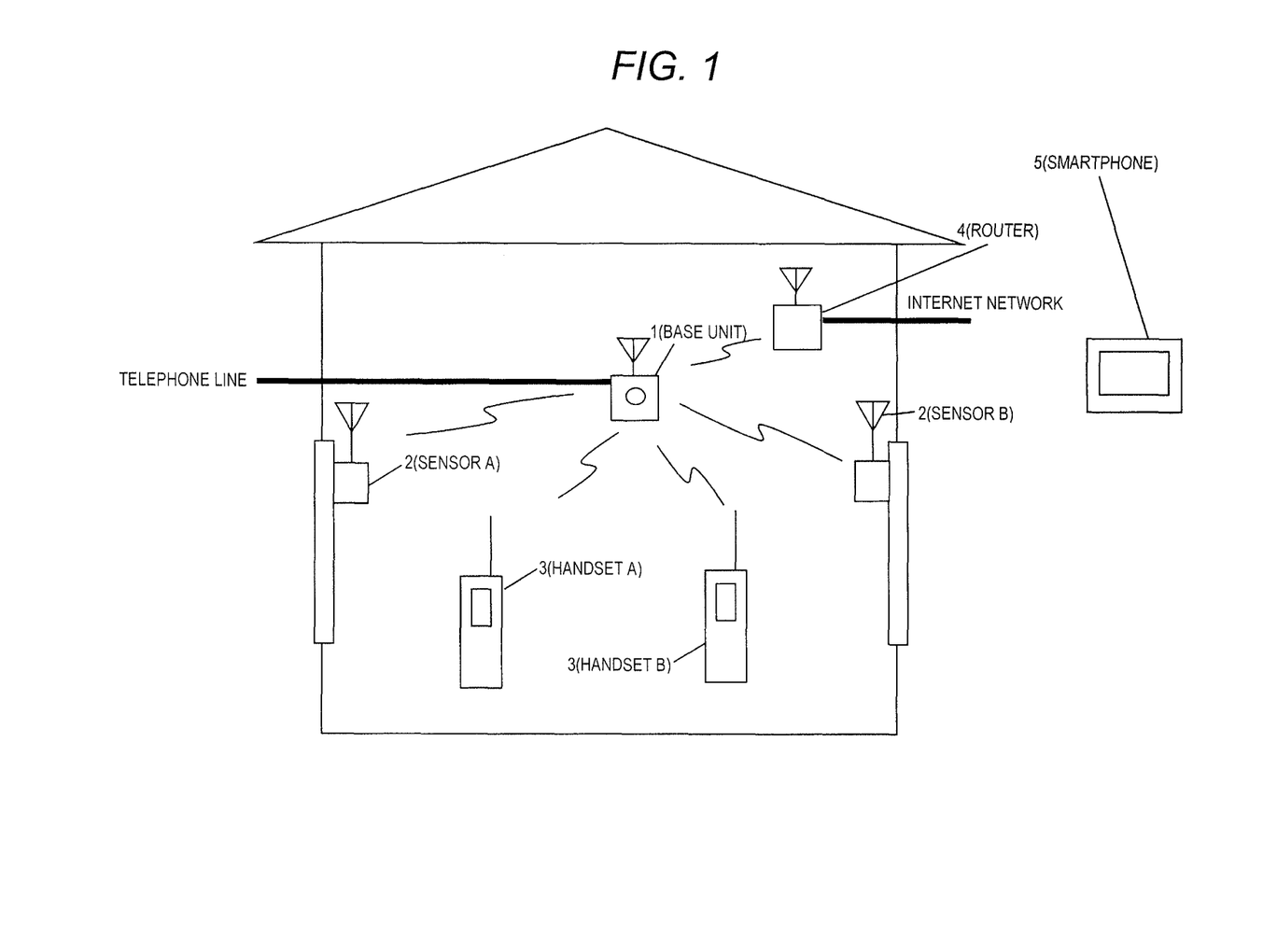
FIG. 1 is a diagram illustrating one example of a home automation network system that uses a wireless communication device according to a first exemplary embodiment of the present invention.

A configuration example of a wireless communication device according to a first exemplary embodiment is described. FIG. 1 is a diagram illustrating one example of a home automation network system that uses the wireless communication device according to the present embodiment.

The home automation network system that uses the wireless communication device according to the present invention, which is described in FIG. 1, is a system that realizes a telephone function for an outside-line call or for an inside-line call and a crime prevention function of notifying a user inside of or outside of a house that a window is opened or closed. FIG. 1 illustrates a case where the home automation network system is configured from base unit 1, sensor A2, sensor B2, handset A3, handset B3, router 4, and smartphone 5. Sensor A2 and sensor B2 that have the same function, and handset A3 and handset B3 that have the same function are described below as sensor 2 and handset 3, respectively.

In the home automation network system that uses the wireless communication device according to the present invention, which is described in FIG. 1, communication through wireless communication, for example, in compliance with a DECT scheme is possible between base unit 1 and sensor 2 and between base unit 1 and handset 3, and communication through wireless communication, for example, in compliance with a WiFi scheme is possible between base unit 1 and router 4. Base unit 1 is connected to smartphone 5 over the Internet through router 4.

A user makes an outside-line telephone call or an inside-line telephone call with handset 3, by using the home automation network system that uses the wireless communication device according to the present invention, which is illustrated in FIG. 1.

The home automation network system that uses the wireless communication device according to the present invention, which is illustrated in FIG. 1, operates in a normal mode or in a crime prevention mode. The crime prevention mode is a mode in which the user is notified with an alarm and the like that a window is opened, and the normal mode is a mode in which the user is not notified that the window is opened. The user activates the crime prevention mode when he/she leaves a house or goes to bed, and is protected against a burglar's break-in.

In a case where the home automation network system operates in the crime prevention mode, when sensor 2 notifies base unit 1 that the window is opened, base unit 1 notifies handset 3 that the window is opened, base unit 1 and handset 3 raise the alarm, and thus a person in each room is notified that the window is opened. Base unit 1 makes a call to a designated telephone number through a telephone line, and, when the other party answers the call, transits an audio message notifying that the window is opened. Base unit 1 transmits an electronic mail that notifies a registered address that the window is opened, through router 4 over the Internet, and notifies the user of a smartphone that the window is opened.

Configuration of Base Unit 1

Figure 2:
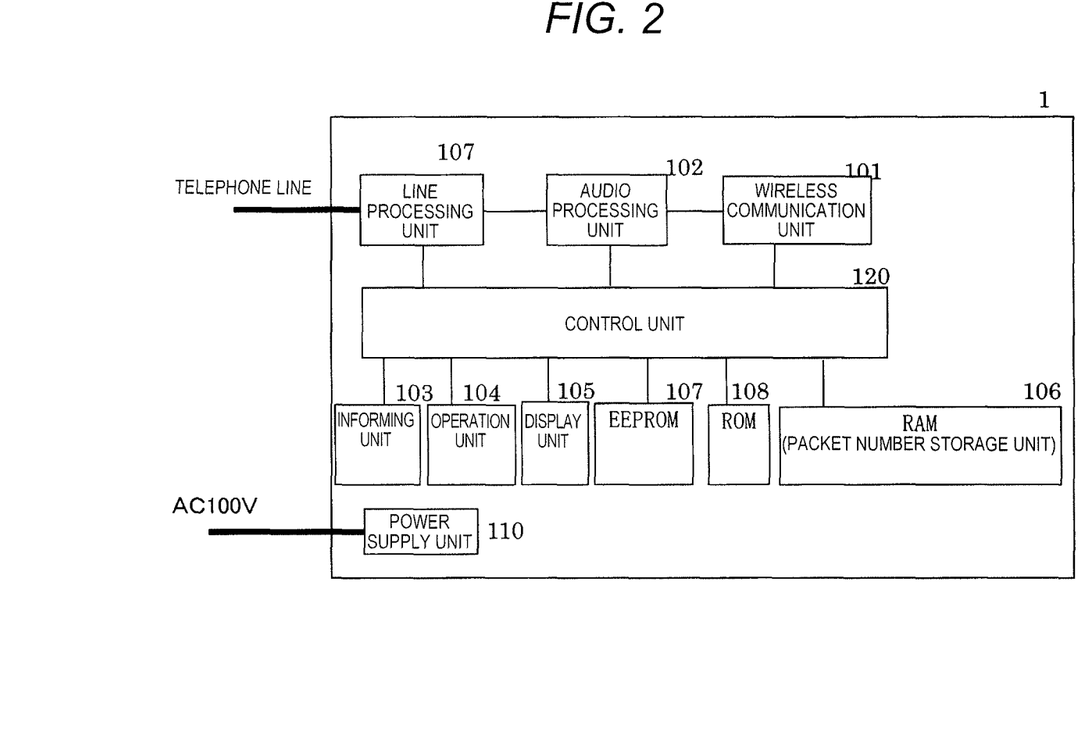
FIG. 2 is a block diagram illustrating one example of a configuration of a base unit according to the first exemplary embodiment of the present invention.

A configuration example of base unit 1 is described. FIG. 2 is a block diagram illustrating a configuration example of base unit 1.

In FIG. 2, base unit 1 has wireless communication unit 101, audio processing unit 102, informing unit 103, operation unit 104, display unit 105, RAM (packet number storage unit) 106, EEPROM 107, ROM 108, power supply unit 110, and control unit 120.

Wireless communication unit 101 transmits and receives control data or a packet for wireless link establishment or a data telephone call to and from sensor 2, handset 3, and router 4 in a predetermined scheme that depends on a device of each of sensor 2, handset 3, and router 4. In the present specification, the "wireless communication" is defined as including wireless transmission and wireless reception.

Audio processing unit 102 converts an audio signal that is input from the telephone line, into a digital signal, generates audio data for transmission to handset 3, converts audio data that is received from handset 3, or data for audio guidance that notifies that a window is opened, into an analog signal, and outputs the resulting analog signal to the telephone line.

In the case where the home automation network system operates in the crime prevention mode, when sensor 2 notifies base unit 1 that the window is opened, informing unit 103 outputs an informing sound.

Operation unit 104 is a button to which a user operation is applied. The user operations, for example, include an operation of interrupting the informing sound, an operation of switching between the crime prevention mode and the normal mode, and the like.

Information is displayed, for the user, on display unit 105. The information, for example, is information indicating whether a current operation state is the crime prevention mode or the normal mode.

Among pieces of information necessary for executing a program for controlling base unit 1, RAM (packet number storage unit) 106 is used for storing data that does not need to be retained at the time of power-off. In a case where the entire RAM (packet number storage unit) 106, also including a storage unit for managing the packet number that is transmitted from the sensor, is referred to, this is described below as RAM 106. In a case where only a storage unit for managing the packet number of RAM (packet number storage unit) 106 is referred to, this is described below as packet number storage unit 106.

Among the pieces of information necessary for executing the program for controlling base unit 1, EEPROM 107 is used for storing data that needs to be retained even at the time of power-off. For example, an identification number for identifying base unit 1 itself or the other party, a telephone number of or a mail address of the other party in a case where the user outside of a house is notified that the window is opened, and the like, which are necessary for performing wireless communication with sensor 2 and handset 3, are stored.

ROM 108 is a memory into which the program for controlling base unit 1 is embedded.

Power supply unit 110 produces a direct current that is necessary for each unit of base unit 1 to operate, from 100 V commercial electric power, and supplies the direct current to each block of base unit 1 (connection to each unit is not illustrated).

Control unit 120 is configured as a central processing unit (CPU), and controls operation of the entire base unit 1 in cooperation with each unit described above. Operation of control unit 120 will be described in detail below.

Functional units that are included in base unit 1 are not limited to 101 to 120 that are illustrated in FIG. 2, and may include other functional units. The other functional units may be ones that realize main functions of base unit 1, and may be ones that realize auxiliary functions that assist the main functions.

Configuration of Sensor 2

Figure 3:
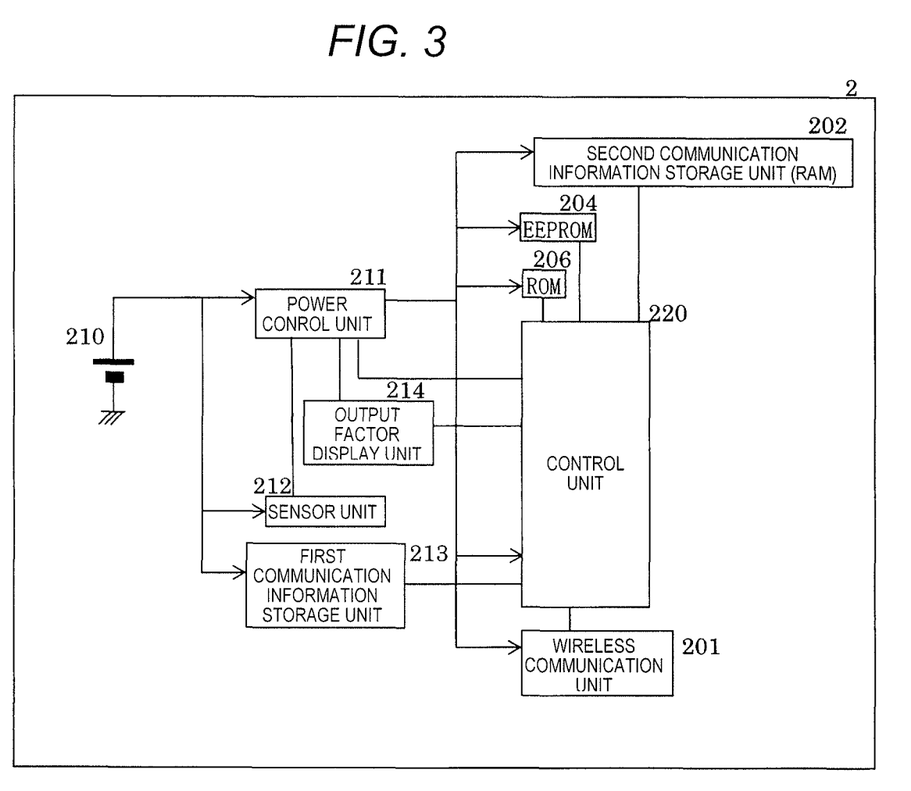
FIG. 3 is a block diagram illustrating one example of a configuration of a sensor according to the first exemplary embodiment of the present invention.

A configuration example of sensor 2 is described. FIG. 3 is a block diagram illustrating a configuration example of sensor 2.

In FIG. 3, sensor 2 has wireless communication unit 201, second communication information storage unit (RAM) 202, EEPROM 204, ROM 206, battery 210, power control unit 211, sensor unit 212, first communication information storage unit 213, output fact display unit 214, and control unit 220.

Wireless communication unit 201 transmits and receives the control data or the packet for the wireless link establishment or the data telephone call to and from base unit 1 in a predetermined scheme.

Among pieces of information necessary for executing a program for controlling sensor 2, second communication information storage unit (RAM) 202 is used for storing data that does not need to be retained when the power control unit cuts off power supply.

Among the pieces of information necessary for executing the program for controlling sensor 2, EEPROM 204, which is a nonvolatile memory, is used for storing data that needs to be retained even at the time of power-off. For example, the identification number for identifying sensor 2 itself or the other party, which is necessary for performing the wireless communication with base unit 1, an authentication code that is necessary when generating an encryption key, and the like are stored.

ROM 206 is a memory into which a program for controlling sensor 2 is embedded.

Battery 210 is a battery that supplies power necessary for operation of sensor 2. For example, a lithium battery with a rated output of 3V and the like are used. Power is supplied from battery 210 directly to sensor unit 212 and first communication information storage unit 213, and is supplied from battery 210 through power control unit 211 to wireless communication unit 201, second communication information storage unit (RAM) 202, EEPROM 204, ROM 206, and control unit 220.

Power control unit 211 supplies the power that is supplied from battery 210, to wireless communication unit 201, second communication information storage unit (RAM) 202, EEPROM 204, ROM 206, and control unit 220 according to a signal from sensor unit 212, and cuts off the power supply to wireless communication unit 201, second communication information storage unit (RAM) 202, EEPROM 204, ROM 206, and control unit 220 according to a signal from control unit 220. In a case where battery 210 is newly mounted and power starts to be supplied from battery 210, the power is supplied from battery 210 to wireless communication unit 201, second communication information storage unit (RAM) 202, EEPROM 204, ROM 206, and control unit 220.

Sensor unit 212 detects that the window is opened, and outputs a signal (described as a power-on signal) that is to be supplied to wireless communication unit 201, second communication information storage unit (RAM) 202, EEPROM 204, ROM 206, and control unit 220, to power control unit 211.

First communication information storage unit 213 is used for storing data that needs to be rewritten as information necessary for shortening the time for the synchronization to base unit 1 and communication activation, or as data necessary to retain even at the time of power-off, according to communication contents in base unit 1. For example, as these pieces of data, there are a frequency (hereinafter referred to a synchronization frequency) that is used when the synchronization to base unit 1 is established, and various pieces of communication information that are necessary for performing the communication and that are transmitted by base unit 1.

Information indicating whether power is supplied to wireless communication unit 201, second communication information storage unit (RAM) 202, EEPROM 204, ROM 206, and control unit 220 by battery 210 being newly mounted or is supplied to wireless communication unit 201, second communication information storage unit (RAM) 202, EEPROM 204, ROM 206, and control unit 220 according to a signal from sensor unit 212, that is, a factor that causes power control unit 211 to supply the power, is displayed on output fact display unit 214.

Control unit 220 is configured as a central processing unit (CPU) and controls operation of the entire sensor 2 in cooperation with each unit described above. When sensor unit 212 detects that the window is opened, control unit 220 activates wireless communication, notifies base unit 1 that the window is opened, and outputs to power control unit 211 a signal (described as a power-off signal) for interrupting the wireless communication and cutting off power supply to wireless communication unit 201, second communication information storage unit (RAM) 202, EEPROM 204, ROM 206, and control unit 220. In a case where the information indicating that the power is supplied by battery 210 being newly mounted is displayed on output fact display unit 214, control unit 220 performs wireless communication for performing generation of the encryption key and initialization of the packet number. The operation of control unit 220 will be described in detail below.

Functional units that are included in sensor 2 are not limited to 201 to 220 that are illustrated in FIG. 3, and may include other functional units. The other functional units may be ones that realize main functions of sensor 2, and may be ones that realize auxiliary functions that assist the main functions.

Operation of Each of Base Unit 1 and Sensor 2

An operational example of the home automation network system that uses the wireless communication device according to the present invention, which is described above, is described.

Figure 4:
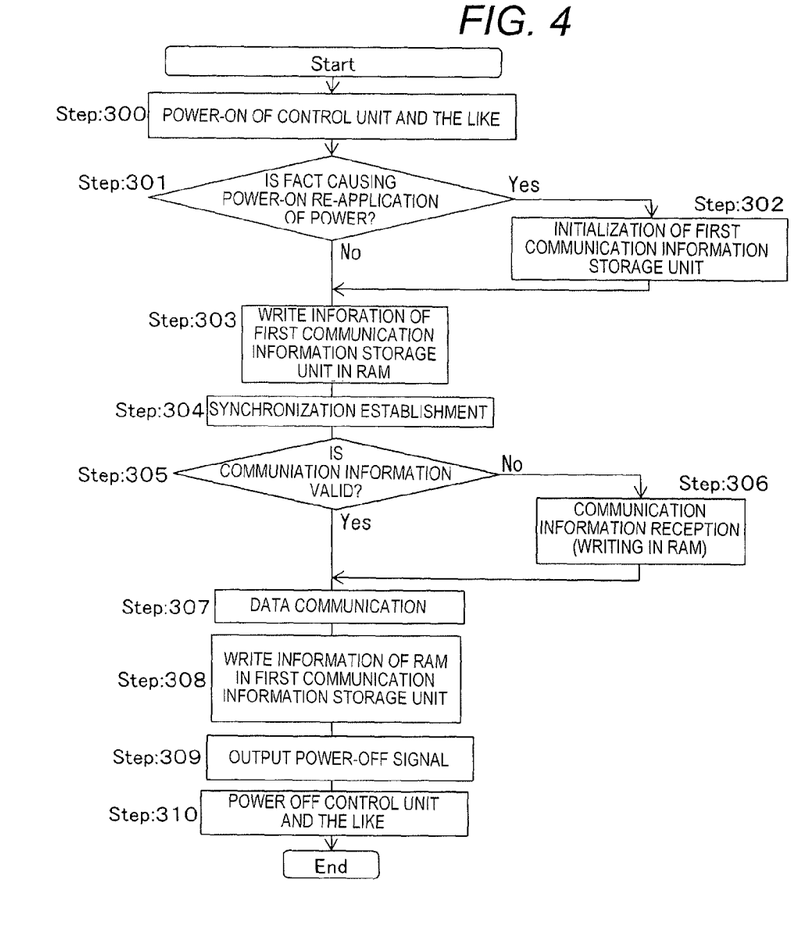
FIG. 4 is a flowchart illustrating an operation of the sensor according to the first exemplary embodiment of the present invention.

FIG. 4 is a flowchart illustrating one example of an operation of a sensor according to the first exemplary embodiment of the present invention.

In a case where battery 210 is not inserted into sensor 2, control unit 220, of course, stops operating. Although battery 210 is inserted, in a waiting state, power control unit 211 is powered off, and control unit 220 stops operating.

At this point, in a case where battery 210 is inserted, but sensor unit 212 in the waiting state detects that the window is opened and thus the power-on signal is output to power control unit 211, power control unit 211 is powered on, and the power is supplied to wireless communication unit 201, second communication information storage unit (RAM) 202, EEPROM 204, ROM 206, and control unit 220. Thus, control unit 220 starts to operate (Step: 300).

When starting to operate, control unit 220 of sensor 2 checks a factor that causes the power control unit 211 to supply the power, referring to display contents of the output factor display unit 214 (Step: 301).

In a case where a factor (factor that causes the power on) that causes the power to be supplied in Step: 301 is re-application of the power (Yes in Step: 301), first communication information storage unit 213 is initialized (Step: 302) and proceeding to Step: 303 takes place. In Step: 302, for example, the smallest frequency of frequencies that are used for communication with base unit 1 is written to a region in which a synchronization frequency of first communication information storage unit 213 is stored, and data indicating that data of a region is invalid (that is, that information from base unit 1 is not received) is written to the region in which various pieces of information which are necessary for performing communication for first communication information storage unit 213 and which are transmitted by base unit 1.

In a case where the factor (the factor that causes the power on) that causes the power to be supplied in Step: 301 is not the re-application of the power, that is, transmission of the power-on signal from sensor unit 212 (No in Step: 301), direct proceeding to Step: 303 takes place.

Consecutively, control unit 220 of sensor 2 writes information of first communication information storage unit 213 to a region that corresponds to second communication information storage unit (RAM) 202 (Step: 303). A variable that is used when executing a control program that is written to ROM 206 is stored in second communication information storage unit (RAM) 202, and thereafter, in a case where sensor 2 establishes the synchronization to base unit 1 and performs the communication, and in a case where the information that is written in Step: 303 is necessary, an operation performs referring to second communication information storage unit (RAM) 202.

Consecutively, control unit 220 of sensor 2 performs control in such a manner that the synchronization to base unit 1 is established at the synchronization frequency that is stored in second communication information storage unit (RAM) 202, and receives a control signal of base unit 1 (Step: 304). For example, in Step: 304, immediately after the battery is inserted, first, an operation is performed in such a manner that the synchronization is established at the smallest frequency of the frequencies that are used for the communication with base unit 1. On the other hand, in a case where the activation is performed due to the power-on signal from sensor unit 212, first, an operation is performed in such a manner that the synchronization is established at the frequency that is received when the previous operation is performed. In any case, when the synchronization is not completed on a frequency that is set, until a frequency on which a frequency can be established is found, the synchronization frequencies that are stored in second communication information storage unit (RAM) 202 are sequentially rewritten, and an operation is performed in such a manner that the synchronization is performed on each frequency.

Consecutively, control unit 220 of sensor 2 checks whether or not communication information that is stored in second communication information storage unit (RAM) 202 is effective information (Step: 305).

In a case where the communication information that is stored in second communication information storage unit (RAM) 202 is not the effective information in Step: 305 (No in Step: 305), control unit 220 of sensor 2 continues to receive a control signal (Step: 306), and when various pieces of communication information that are necessary for the communication and that are transmitted by base unit 1 are all received, proceeding to Step: 307 takes place. In Step: 306, for example, in a case where base unit 1 and sensor 2 perform the wireless communication in compliance with the DECT scheme, the control signals continue to be received until static system info, extended RF carriers part 1, fixed part capabilities, extended fixed part capabilities, and extended fixed part capabilities part 2 in the Qt message are received.

On the other hand, in a case where the communication information that is stored in the second communication information storage unit (RAM) 202 is the effective information in Step: 305 (Yes in Step: 305), direct proceeding to Step: 307 takes place.

Based on the communication information that is stored in second communication information storage unit (RAM) 202, control unit 220 of sensor 2 starts the communication with base unit 1, and performs packet communication for notifying that the power is applied, or that the window is opened (Step: 307).

Subsequently, control unit 220 of sensor 2 writes the communication information that is stored in second communication information storage unit (RAM) 202, to first communication information storage unit 213 (Step: 308). At this time, the communication information that is stored in second communication information storage unit (RAM) 202, and communication information that is stored in first communication information storage unit 213 are compared, and only when there is a difference between the two pieces of communication information, the communication that is stored in second communication information storage unit (RAM) may be written to first communication information storage unit 213.

Subsequently, control unit 220 of sensor 2 outputs a power-off signal to power control unit 211 (Step: 309), power control unit 211 is powered off, the power supply to wireless communication unit 201, second communication information storage unit (RAM) 202. EEPROM 204, ROM 206, and control unit 220 is cut off (Step: 310), and control unit 220 stops operating. Thus, a processing sequence is ended.

Figure 5:
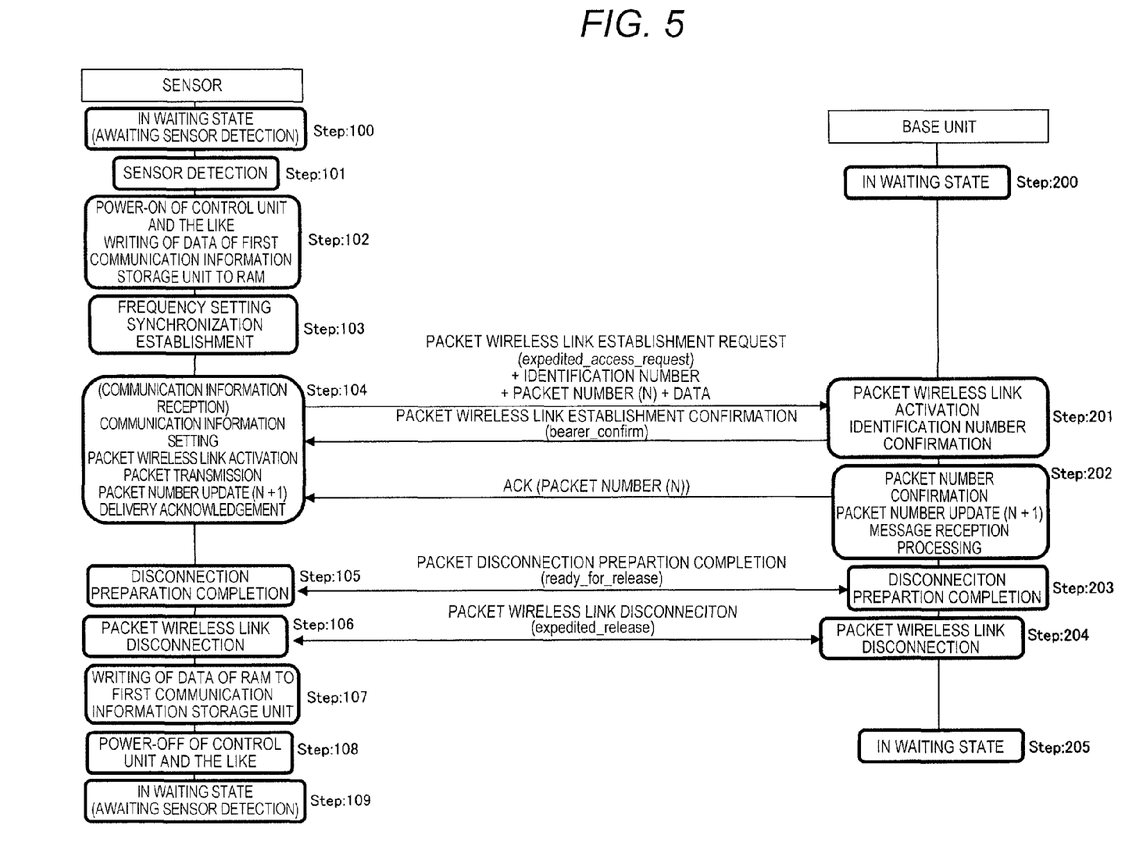
FIG. 5 is a diagram illustrating one example of a signal that is transmitted and received through wireless communication between the base unit and the sensor according to the first exemplary embodiment of the present invention and of operation of each of the base unit and the sensor.

Next, in the waiting state, an operation of the communication between base unit 1 and sensor 2 in the case where it is detected in sensor unit 212 of sensor 2 that the window is opened is described.

FIG. 5 is a diagram illustrating one example of a signal that is transmitted and received through wireless communication between base unit 1 and sensor 2 when it is detected that the window is opened, and of operation of each of base unit 1 and sensor 2.

In the waiting state, in sensor 2, power is supplied only to sensor unit 212 and first communication information storage unit 213, and sensor unit 212 operates in such a manner as to detect that the window is opened (Step: 100).

On the other hand, in the waiting state, in base unit 1, control unit 120 operates in such a manner that wireless communication unit 101 is controlled to receive a signal from the sensor while transmitting a signal (hereinafter referred to as a control signal) for enabling the sensor to recognize the base unit and to retain synchronization (Step: 200). Base unit 1 periodically interrupts the control signal, performs reception at a frequency that is used for the control signal, on a slot on which the control signal is transmitted, and, in a case where a level of an interfering wave exceeds a predetermined value, operates in such a manner as to change a transmission frequency of the control signal.

When it is detected in sensor unit 212 of sensor 2 that the window is opened, sensor unit 212 outputs the power-on signal to power control unit 211 (Step: 101), power is supplied to control unit 220 and the like through power control unit 211 (Step: 102), and control to perform the wireless communication with the base unit is started. At this time, the information indicating that the power is supplied according to the signal from sensor 212 is displayed on output fact display unit 214. In Step: 102, if the fact (the fact that causes the power-on) that causes the power to be supplied is that there is no re-application of the power, first communication information storage unit 213 is initialized. In Step: 102, control unit 220 of sensor 2 writes the information of first communication information storage unit 213 to the region that corresponds to second communication information storage unit (RAM) 202.

Subsequently, control unit 220 of sensor 2 reads an identification number of the base unit and an identification number of the sensor 2 itself, from EEPROM 204, performs control in such a manner that the synchronization to base unit 1 is established at the synchronization frequency that is stored in second communication information storage unit (RAM) 202, establishes the synchronization to the base unit, and controls wireless communication unit 201 in such a manner that the identification number of the sensor 2 itself is notified and the wireless communication is performed (Step: 103). For example, in a case where base unit 1 and sensor 2 perform the communication through the wireless communication in compliance with the DECT scheme, base unit 1 transmits a control signal for enabling a frame and a slot in TDMA to retain synchronization, and by receiving the control signal, sensor 2 establishes the synchronization of the frame and the slot in TDMA to base unit 1 and performs wireless communication in compliance with a TDMA scheme. At this time, base unit 1 transmits the identification number that is stored in EEPROM 107, in a state of being included in the control signal, and by receiving a notification, sensor 2 specifies base unit 1 of the home automation network system to which sensor 2 itself belongs. When the synchronization is not completed on a frequency that is set, until the frequency at which the synchronization can be established is found, the synchronization frequencies that are stored in second communication information storage unit (RAM) 202 are sequentially rewritten, and an operation is performed in such a manner that the synchronization is performed on each frequency.

When the synchronization to base unit 1 is completed, control unit 220 of sensor 2 establishes a communication link to base unit 1 according to the communication information that is stored in second communication information storage unit (RAM) 202 (Step: 104). In a case where the communication information that is stored in second communication information storage unit (RAM) 202 is not the effective information, the control signal continues to be received, communication information necessary for establishing the communication link to base unit 1 is received, an operation is performed in such a manner that the received communication information is stored in second communication information storage unit (RAM) 202, and after all pieces of information are received, the communication link to base unit 1 is established. In order to establish the communication link from sensor 2 to base unit 1, in Step: 104, a packet that results from encrypting a message notifying base unit 1 of a packet wireless link establishment request and that the window is opened, using an encryption key and from packetizing encrypted data is transmitted to base unit 1, and control is performed in such a manner that delivery acknowledgement is performed. At this time, control unit 220 reads the packet number for the delivery acknowledgement that is attached to the packet, from first communication information storage unit 213 and performs control in such a manner that the packet number which is stored in first communication information storage unit 213 in preparation for the next-time packet transmission is updated. Control unit 220 reads the identification number which is stored in EEPROM 204 and performs control in such a manner that the identification number which is read as one portion of the wireless establishment request message is transmitted.

On the other hand, when receiving a packet wireless establishment request from sensor 2, control unit 120 of base unit 1 checks an identification number of sensor 2, which is sent, by comparing the identification number of sensor 2 against an identification number of every sensor that is stored in EEPROM 107, and determines from which sensor a signal is sent. In a case where the packet wireless establishment request comes from a registered handset, control unit 120 transmits a packet wireless establishment confirmation to sensor 2 and establishes a wireless link for packet communication (Step: 201).

Control unit 120 reads a corresponding packet number of the sensor, among the packet numbers, which are stored in packet number storage unit 106, compares the packet number that is sent, against the packet number that is read, and determines whether or not the two packet numbers are the same. In a case where the packet number that is sent and the packet number of the sensor, which is stored in packet number storage section 106, are the same, control is performed in such a manner that processing that receives a message that is sent in the packet format, that is, a message notifying that the window is opened, for example, processing that activates the alarm in informing unit 103 or notifies handset 3 and smartphone 5 that the window is opened, is performed, that the packet number corresponding to sensor 2, which is stored in packet number storage section 106 in preparation for the next-time packet reception, is updated, and that the delivery acknowledgement (ACK) notifying sensor 2 that the packet is received is sent (Step: 202).

When the transmission and reception of the delivery acknowledgement (ACK) is completed and packet communication interruption preparation is completed, both sensor 2 and base unit 1 send a packet disconnection preparation completion message notifying that the packet communication interruption preparation is completed (Step: 105) (Step: 203).

When packet disconnection preparation completion is received and the other party recognizes that packet communication interruption preparation is completed, sensor 2 and base unit 1 transmit a packet wireless link disconnection message notifying that the packet wireless link is disconnected, and interrupt transmission and reception operations for the packet communication (Step: 106) (Step: 204).

When the transmission and reception operations for the packet communication are interrupted, control unit 220 of sensor 2 writes information that is stored in second communication information storage unit (RAM) 202 to a region that corresponds to first communication information storage unit 213 (Step: 107), outputs the power-off signal to power control unit 211 and cuts off the power supply to wireless communication unit 201, second communication information storage unit (RAM) 202, EEPROM 204, ROM 206, and control unit 220 (Step: 108), and proceeds to the waiting state in which it is detected that the window is opened (Step: 109).

In the same manner, when the transmission and reception operations for the packet communication are interrupted, base unit 1 also proceeds to the waiting state in which base unit 1 waits for communication with the sensor (Step: 205).

In a case where base unit 1 and sensor 2 perform the communication through the wireless communication in compliance with the DECT scheme, the packet wireless link establishment request is a message called expedited_access_request that is a message for controlling a MAC layer, a packet wireless link establishment confirmation is a message called bearer_confirm that is the message for controlling the MAC layer, the packet cutting-off preparation completion is a message called ready_for_release that is the message for controlling the MAC layer, and the packet wireless link cutting-off is a message called expedited_release. Packetization of data is performed in compliance with a FU10a format that is stipulated with a DLC layer, and a message (ACK) for the delivery acknowledgement is established in a FU10d format that is stipulated with the DLC layer.

As described, in the wireless communication device according to the present invention, while the control unit transmits the control signal at the same frequency, although a block necessary for the wireless communication is powered off in a case where the communication is not in progress, in a case where an event occurs and the synchronization to the control station is established, reception for the synchronization for which a frequency at which the control signal is transmitted is selected is started and the synchronization to the control station can be established within a short period of time. Because of this, the responsiveness becomes high and there is no need to perform the reception while changing a frequency at which a control signal is transmitted. This is effective in making power consumption by the wireless communication device low.

In the wireless communication device according to the present invention, although the block necessary for the wireless communication is powered off in the state where the communication is not in progress, in the case where the event occurs, and the communication with the control station is started, the communication with the base unit can be performed immediately after the synchronization to the control station, without receiving the control signal for receiving the information necessary for starting the wireless communication. This is effective in making power consumption by the wireless communication device low.

In the wireless communication device according to the present invention, information effective in making power consumption lower is selected by retaining information and is stored in a storage unit that is not powered off even in the state where the communication is not in progress, and during the communication, an operation is performed in such a manner that, the information is copied to the storage unit that is normally used, for use by the control unit. Because of this, a capacity of the storage unit that is not powered off can be made small and an amount of power that is consumed in the storage unit that is not powered off can be reduced. This is effective in making power consumption by the wireless communication device low. In a case where processing that accesses the storage unit that is not powered off even in the state where the communication is not in progress is more complicated than processing that accesses the storage unit that is normally used, the number of times that the storage unit, which is not powered off even in the state where the communication is not in progress, is accessed is decreased. Because of this, processing time can be shortened. This is effective in making power consumption by the wireless communication device low. The wireless communication device according to the present invention is useful as a wireless communication device for building a home network.

What is claimed is:

1. A wireless communication device that is configured to transmit transmits a data packet including a packet number to an other communication party, the wireless communication device comprising:
   a battery;
   a first storage to which power is supplied from the battery and in which the packet number is stored;
   a second storage in which a frequency that is used for communication with the other communication party is stored;
   an event detector to which the power is supplied from the battery and that detects an occurrence of an event;
   a controller;
   a wireless communicator that performs transmission and reception of the data packet between the wireless communication device and the other communication party, under the control of the controller; and
   a connection controller that supplies power of the battery to the second storage, the controller, and the wireless communicator, and that cuts off the supply of the power to the second storage, the controller, and the wireless communicator according to an instruction of the controller, in a case where the battery is newly mounted, or in a case where the event detector detects the occurrence of the event,
   wherein, in a case where the event detector detects the occurrence of the event, the controller generates a data packet including a wireless link establishment request, a message notifying the occurrence of the event, and the packet number that is stored in the first storage, transmits the generated data packet from the wireless communicator to the other communication party at the frequency that is stored in the second storage, updates the packet number that is stored in the first storage when a delivery acknowledgement is received from the other communication party, and gives an instruction to cut off the supply of the power to the connection controller, wherein, in a case where the battery is newly mounted, the controller attempts to establish synchronization between the wireless communication device and the other communication party, using the frequency that is stored in the second storage, wherein, in a case where the battery is newly mounted and synchronization is not able to be established, the controller attempts to establish synchronization while sequentially changing frequencies, and wherein, in the case where the battery is newly mounted and synchronization is able to be established, the controller rewrites the frequency that is stored in the second storage, as a value that results when the synchronization is established, rewrites the packet number that is stored in the first storage, as an initial value that is determined in advance, and gives the instruction to cut off the supply of the power to the connection controller.

2. The wireless communication device of claim 1, wherein the event detector is a sensor that detects that a window is opened, as the occurrence of the event.

3. A wireless communication method using a wireless communication device that is configured to transmit a data packet including a packet number to an other communication party, the wireless communication device including a battery;
a first storage to which power is supplied from the battery and in which the packet number is stored;
a second storage in which a frequency that is used for communication with the other communication party is stored;
an event detector to which the power is supplied from the battery and that detects an occurrence of an event; and
a controller, the wireless communication method comprising:
performing transmission and reception of the data packet between the wireless communication device and the other communication party by a wireless communicator, under the control of the controller; and
supplying power, by the connection controller, of the battery to the second storage, the controller, and the wireless communicator, and cutting off the supply of the power to the second storage, the controller, and the wireless communicator according to an instruction of the controller, in a case where the battery is newly mounted, or in a case where the event detector detects the occurrence of the event, wherein, in a case where the event detector detects the occurrence of the event, a data packet including a wireless link establishment request, a message notifying the occurrence of the event, and the packet number that is stored in the first storage is generated, the generated data packet is transmitted from the wireless communicator to the other communication party at the frequency that is stored in the second storage, the packet number that is stored in the first storage is updated when a delivery acknowledgement is received from the other communication party, and an instruction to cut off the supply of the power to the connection controller is given, wherein, in a case where the battery is newly mounted, establishing synchronization between the wireless communication device and the other communication party is attempted, using the frequency that is stored in the second storage, wherein, in a case where the battery is newly mounted and synchronization is not able to be established, establishing synchronization while sequentially changing frequencies is attempted, and wherein, in the case where the battery is newly mounted and synchronization is able to be established, the frequency that is stored in the second storage is rewritten, as a value that results when the synchronization is established, the packet number that is stored in the first storage is rewritten as an initial value that is determined in advance, and gives the instruction to cut off the supply of the power to the connection controller.

4. The wireless communication method of claim 3, further comprising: detecting that a window is opened, as the occurrence of the event, by the event detector, which is a sensor.

* * * * *